Figure 1:
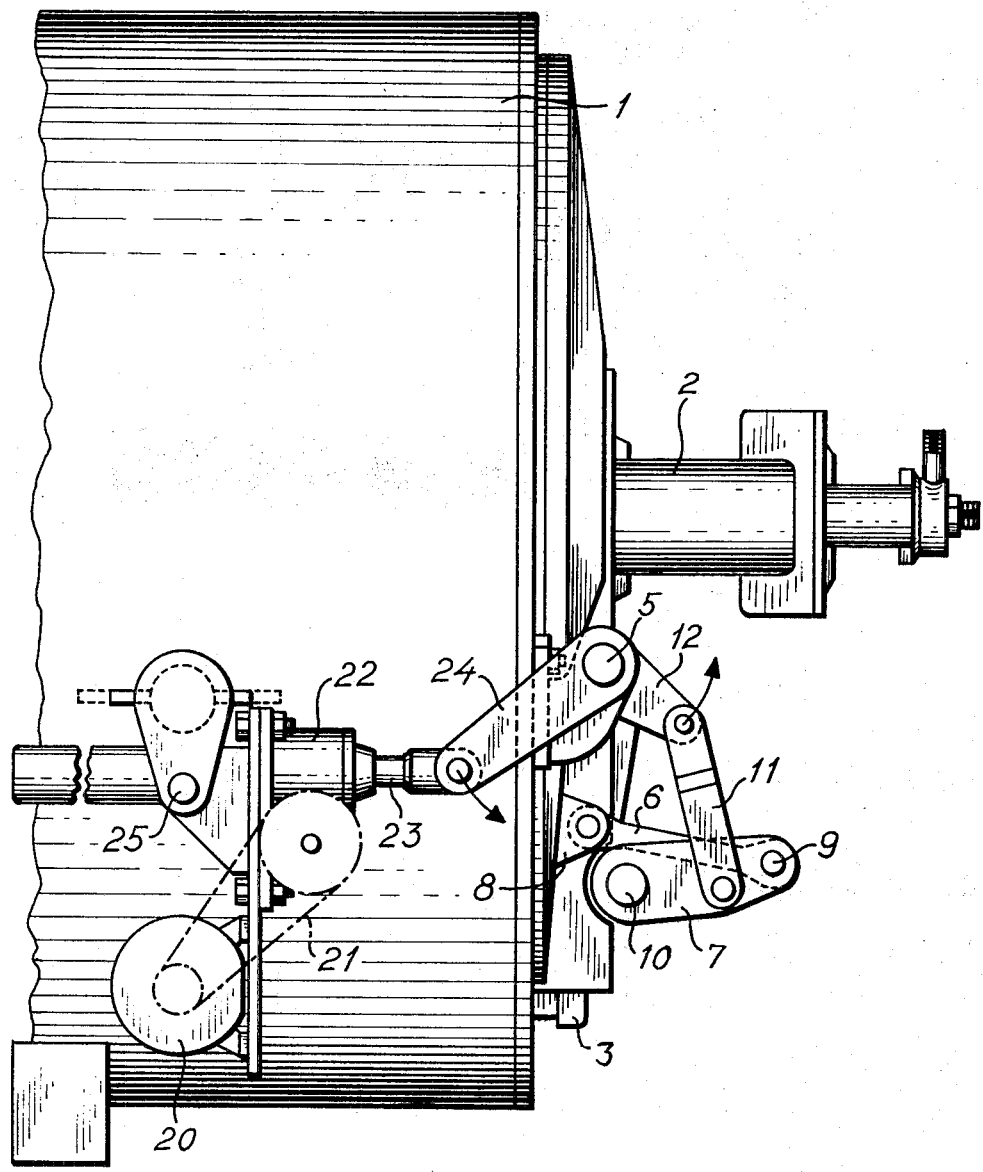

United States Patent

[11] 3,540,618

[72] Inventor Jakob Jakobsen Lildal
 Aage Beksvej, Randers, Denmark
[21] Appl. No. 757,726
[22] Filed Sept. 5, 1968
[45] Patented Nov. 17, 1970
[32] Priority Sept. 5, 1967
[33] Denmark
[31] No. 4439/67

[54] MANEUVERING MECHANISM FOR THE OUTLET COVER OF A DRY-MELTER
3 Claims, 3 Drawing Figs.

[52] U.S. Cl................................................ 220/36, 220/57
[51] Int. Cl............................................... B65d 43/26; A47j 27/24
[50] Field of Search........................................ 220/34, 36, 57; 99/235

[56] References Cited
UNITED STATES PATENTS
2,539,990 1/1951 Chapman..................... 220/36UX
2,639,601 5/1953 Miller........................... 220/36X
2,863,375 12/1958 Long............................ 220/57X
2,884,159 4/1959 Simpson....................... 220/34X FOREIGN PATENTS
888,500 1/1962 Great Britain................ 220/36

Primary Examiner—George E. Lowrance
Attorney—Craig, Antonelli, Stewart & Hill

ABSTRACT: A maneuvering mechanism for the outlet cover of a dry-melter, wherein the cover is pivotally mounted at the top edge thereof. A pair of pivotal, mutually connected arms are provided at both sides of the cover, and the ends of the arms opposite the point of rotation are pivotally mounted on the boiler wall and the cover so that the arms of each pair, when the cover is closed, form a small angle with each other. Each of the arms mounted on the cover close to the point of rotation is pivotally connected to a third arm which, at the opposite end, is pivotally connected to a fourth arm fixed to a horizontal bar. The horizontal bar is pivotally mounted on the boiler wall above the cover and, at one end thereof, is connected to a power element for maneuvering of the cover.

Patented Nov. 17, 1970

3,540,618

Sheet 1 of 3

INVENTOR
JAKOB JAKOBSEN LILDAL

BY
Craig & Antonelli

ATTORNEYS

MANEUVERING MECHANISM FOR THE OUTLET COVER OF A DRY-MELTER

A dry-melter is an apparatus for use in the treatment of animal substances such as slaughtering offal and animals dead from accident or disease which it is intended to decompose into fat and bone meal by heating to a temperature of about 140°C. and a pressure of up to about 3 Atm. during agitation. Usually a dry-melter comprises a horizontal cylindrical boiler having suitable heating means e.g. a steam mantle, and an agitator with a generally horizontal centrally positioned shaft. The boiler has on its top side a pressure lid which covers a filling opening for the animal substances. At one of the end walls of the cylindrical boiler there is a substantially centrally positioned main bearing for the agitator, and below this bearing an outlet cover which is to be opened when the processing of the material has been finished and the pressure and temperature in the boiler have decreased after which the material can flow out.

Since the boiler during processing contains melted fat at high temperature and high pressure, apparatuses of the above type are provided with safety devices which ensure that the outlet cover is not opened until the temperature and the pressure in the boiler have decreased to certain predetermined values. However, in some cases the safety devices may fail or the operator may fail, and in case the operator opens the outlet cover too early, there will be a risk that he is seriously hurt by hot melted fat which spirts out of the boiler. In order to avoid this situation the maneuvering mechanism for the outlet cover is usually worked out in such a way that the cover in a first step is manually opened a few millimetres to a first fixed position and thereafter in a second step when the operator is sure that no hot melted fat comes out of the boiler it is thoroughly opened. However, this procedure is rather complicated and there is still a risk for the operator because some drops of melted fat may reach him when the cover is opened to its first position.

It is the purpose of the present invention to provide an improved maneuvering mechanism for the outlet cover of a dry-melter of the type referred to above, said cover being pivotably mounted at its top edge and said maneuvering mechanism being automatically operable at a safe distance and still ensuring that the cover only is opened a few millimetres in the beginning so that it again may be closed in case the pressure and the temperature in the boiler are too high.

The maneuvering mechanism according to the invention is characterized in that operating means are provided at both sides of the cover, each operating means comprising a pair of pivotal, mutually connected arms which at the ends opposite the point of rotation are pivotally mounted on the boiler wall and the cover respectively in such a way that the arms of each pair when the cover is closed form a small angle with each other and that each of the arms mounted on the cover close to the point of rotation is pivotally connected to a third arm which in the opposite end is pivotally connected to a fourth arm, said fourth arm being fixed to a horizontal bar, said bar being pivotally mounted on the boiler wall above the cover and at its one end connected to a power element for maneuvering of the cover.

This mechanism has so small dimensions that it can be placed under the above mentioned main bearing for the agitator, and it provides a relatively slow movement of the cover in the beginning so that a serious accident is avoided in case that the cover due to an error is opened before the pressure in the boiler has reached atmosphere pressure.

According to a preferred embodiment of the invention said bar may also serve as support axle for the outlet cover whereby the dimensions of the structure may be further reduced.

According to further preferred embodiment of the invention the power element is suspended on the boiler wall and it comprises an engine-driven coupling nut which reciprocally moves the nonturnable screw spindle, said screw spindle being pivotally connected by a linkage to an arm which itself is fixed to the above bar.

Figure 2:
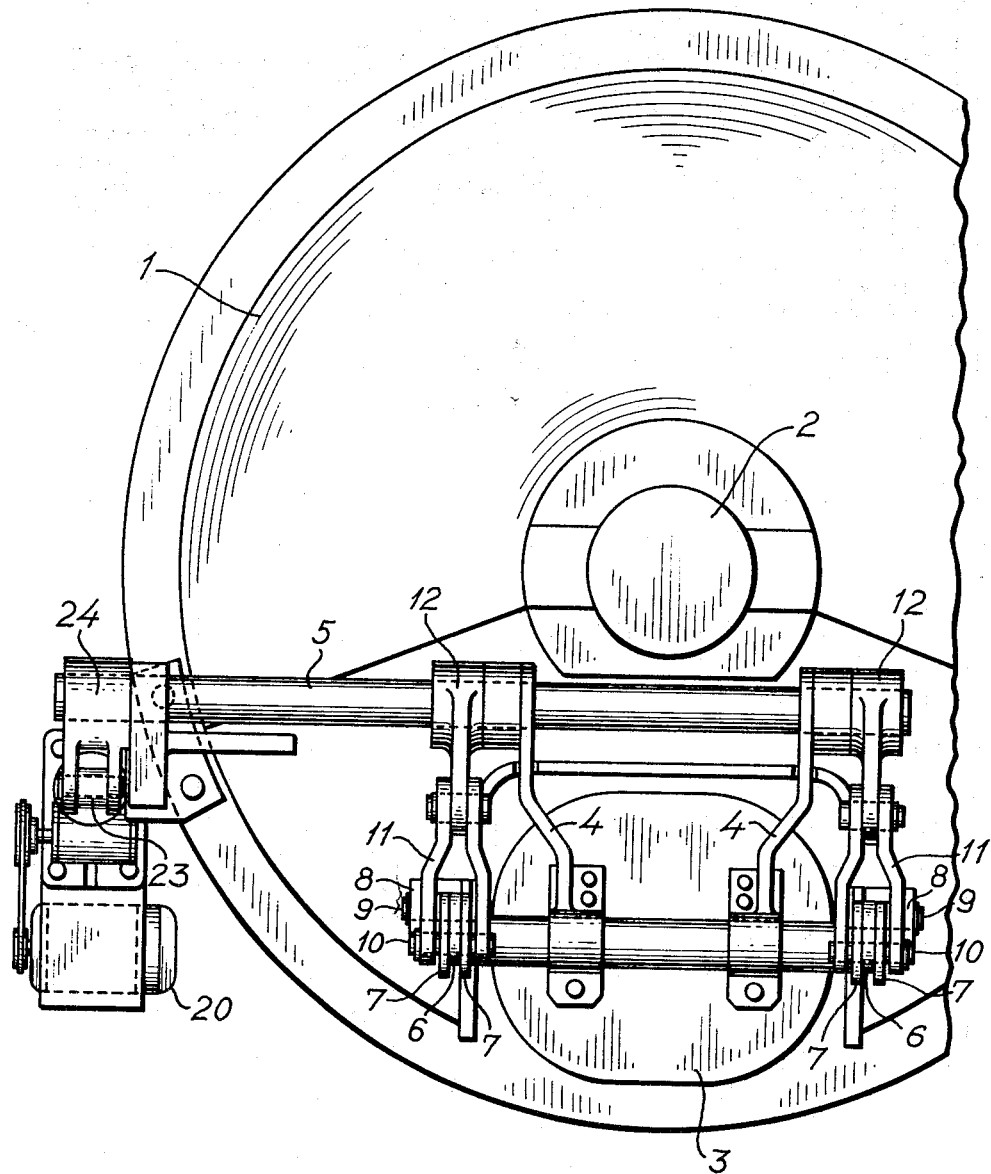
Figure 3:
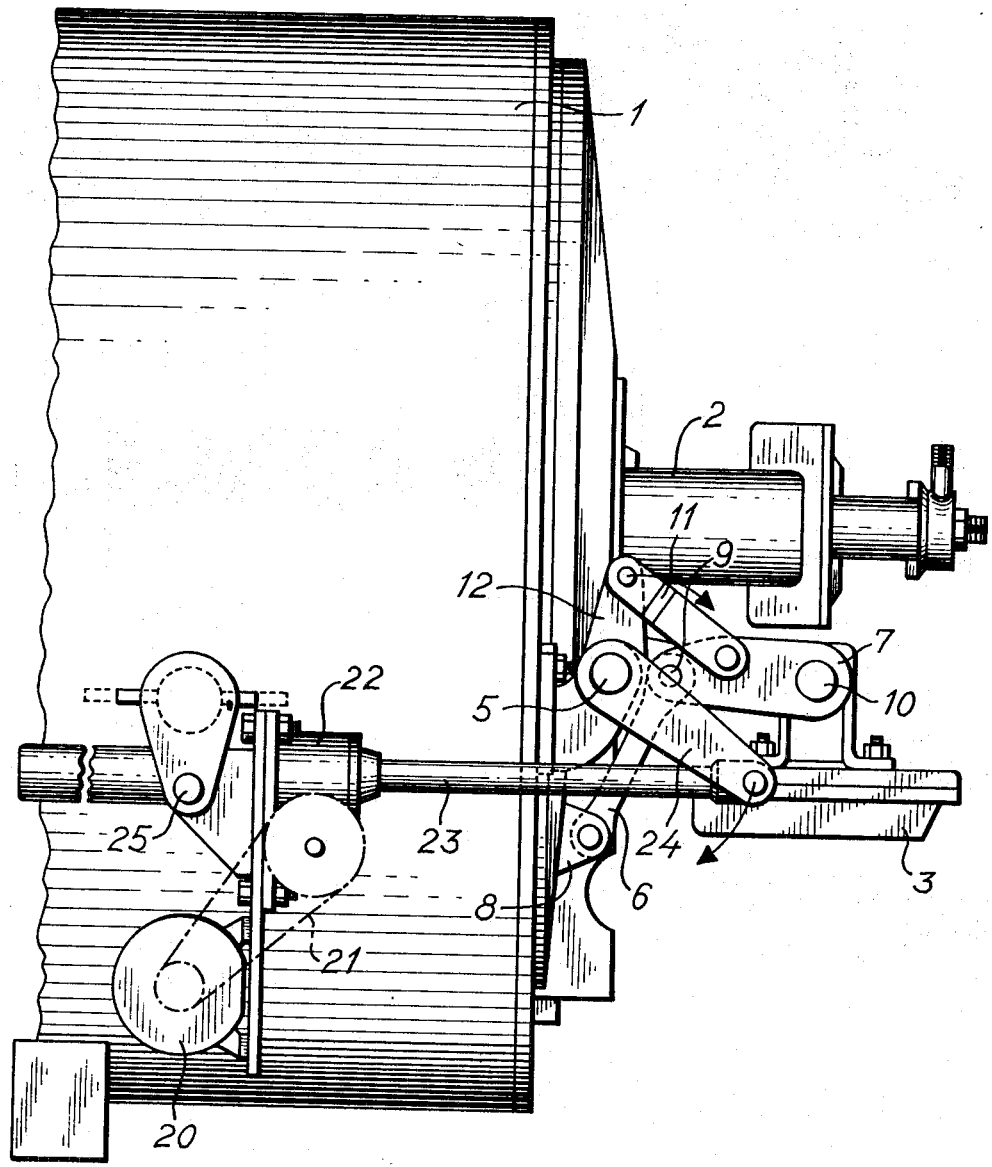

In order that the invention may be clearly understood, a maneuvering mechanism in accordance with the present invention will now be described by way of example with reference to the accompanying drawing, in which:

FIG. 1 is a side view of a part of a dry-melter with a maneuvering mechanism according to the invention and with the outlet cover in its closed position, FIG. 2 is a front picture of the maneuvering mechanism, and FIG. 3 is a side view as in FIG. 1 but with the outlet cover in its open position.

Referring now to the drawing, 1 designates one end of a dry-melter which essentially comprises a horizontal cylindrical boiler. One the end wall of the boiler shown there is placed a main bearing for the journal of an agitator (not shown) placed in the boiler. This is in itself known and does not form part of the present invention and shall therefore not be further discussed.

Below the main bearing 2 there is in the end wall an outlet closed by a cover 3. The cover 3 is by means of mountings 4 pivotally suspended in a horizontal bar 5 between the outlet and the main bearing 2. The bar 5 is pivotally mounted on the end wall of the boiler as it will be explained in more detail in the following.

For maneuvering of the cover and retaining it in this closed position against the pressure which is in the boiler during processing of animal substances a pair of arms is provided at both sides of the cover, each pair consisting of an arm 6 which at its one end is pivotally connected to a mounting 8 on the end wall of the boiler and at the opposite end at 9 is pivotally connected to another arm 7 which again is pivotally connected to a traversing bar 10 which is fixed to the cover 3.

In order to provide symmetrical load of the bearings, the arm 7 may as shown in FIG. 2 comprise two similar plates placed on both sides of the arm 6.

The arm 7 is close to the junction 9 pivotally connected to a third arm 11 which as shown in FIG. 2 may have fork-shape and with its forks encircle the arms 6 and 7. Each of the arms 11 is at their opposite ends pivotally connected to an arm 12 which by a keyed joint is fixed to the shaft 5.

By turning of the shaft 5 in counterclockwise direction from the position shown in FIG. 1, the arms 12 will via the arms 11 act on the pairs of arms 6, 7 in such a way that the cover 3 is turned around the shaft 5 in the beginning very slow and thereafter faster until the cover 3 has reached the open position shown in FIG. 3. When the shaft 5 is turned clockwise from the position shown in FIG. 3, the cover 3 is moved back to the closed position shown in FIG. 1 whereby the acute angle between the arms 6 and 7 and the action from the arm 11 close to the point of rotation 9 will have the effect that the power action from the arms 12 is enlarged to a strong closing pressure on the cover 3 so that this will keep the outlet opening closed against the pressure in the boiler during processing.

For turning of the shaft 5 there is used a power means placed on one side of the boiler and comprising an electric motor 20 which by means of a V-belt and a worm drive acts on a coupling nut (not shown) placed in a housing 22. By turning of the coupling nut, a screw spindle 23 is displaced whereby it acts on an arm 24 fixed by a keyed joint to the shaft 5. Since the connection point between the screw spindle 23 and the arm 24 described a curved way, the power element is revolvably suspended on a tap means 25 fixed to the boiler wall.

I claim:

1. A maneuvering mechanism for the outlet cover of a dry-melter, said cover being pivotally mounted at its top edge, characterized by the fact that operating means are provided at both sides of the cover each operating means comprising a pair of pivotal, mutually connected arms which at the ends opposite the point of rotation are pivotally mounted on the boiler wall and the cover respectively in such a way that the arms of each pair when the cover is closed form a small angle with each other and that each of the arms mounted on the cover close to the point of rotation is pivotally connected to a third arm which in the opposite end is pivotally connected to a fourth arm, said fourth arm being fixed to a horizontal bar, said bar being pivotally mounted on the boiler wall above the cover and at its one end connected to a power element for maneuvering of the cover.

2. A maneuvering mechanism according to claim 1, characterized in that said bar also serves as support axle for said cover.

3. A maneuvering mechanism according to claim 1, characterized in that said power element is revolvably suspended on the boiler wall and that it comprises an engine-driven coupling nut which reciprocally moves a nonturnable screw spindle, said screw spindle being pivotally connected by a linkage to an arm which itself is fixed to said bar.